Figure 1:
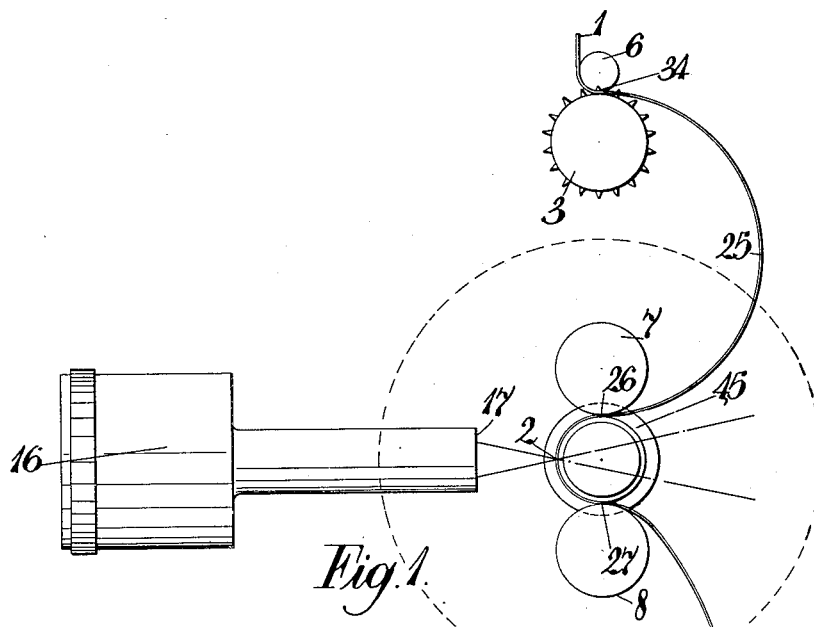

Nov. 20, 1934.  E. E. W. ANDERSON ET AL  1,980,978
METHOD AND APPARATUS FOR ADVANCING FILM PAST
A PLACE OF RECORDING OR REPRODUCTION
Filed June 15, 1931

E. E. W. Andersson
& G. K. V. Johanson
INVENTORS

By: Marks & Clerk
ATT'YS.

Patented Nov. 20, 1934

1,980,978

UNITED STATES PATENT OFFICE 1,980,978

METHOD AND APPARATUS FOR ADVANCING FILM PAST A PLACE OF RECORDING OR REPRODUCTION

Emil Einar Wilhelm Anderson and Georg Karl Vilhelm Johanson, Stockholm, Sweden, assignors to Aga-Baltic Radio A. B., Stockholm, Sweden Application June 15, 1931, Serial No. 544,636
In Sweden January 17, 1931

16 Claims. (Cl. 271—2.3)

The present invention relates to the driving of film or other tape-like material, particularly film upon which acoustic or optical registration is to be recorded or printed or from which such registration is to be reproduced.

In recording upon or reproducing from such film, it is highly desirable that the speed of the film at the place of recording or reproduction be absolutely constant or as nearly so as possible. This is particularly true in the case of films of the kind upon which photographic sound tracks or bands are recorded in addition to a series of pictures adapted to be projected by a motion picture projector. The slightest variations in the speed of such films at the place of recording or reproduction produce distortions in the reproduced sound that are highly undesirable.

In order to avoid variations in the speed of film at the place of recording or reproduction, several different modes and means for advancing the film past such place have heretofore been suggested, but all of the previous suggestions of which we are aware have fallen short of the complete attainment of the desired object.

It is, therefore, a principal object of the present invention to provide novel method and means of improved nature for advancing film past a place of recording or reproduction so that constant speed of movement of the film at such place is obtained. Other and more detailed objects of the invention will appear as the following description proceeds.

Briefly, it may be said that the objectives of the invention are attained by driving the film by the aid of suitable driving mechanism which engages the film at one or more places spaced from the place of recording or reproduction and between which places the film is curved in slack condition, and by causing the film to drive one or more idler rollers with which it is in contact adjacent the place of recording or reproduction, at least one of which rollers is maintained at constant rotative speed due to the action of inertia mass associated therewith.

For a more complete understanding of the nature of the invention and the manner in which it may be carried into effect, reference should be had to the accompanying drawing forming a part of this specification and illustrative of one practical embodiment of the invention, and to the ensuing description thereof.

Figure 2:
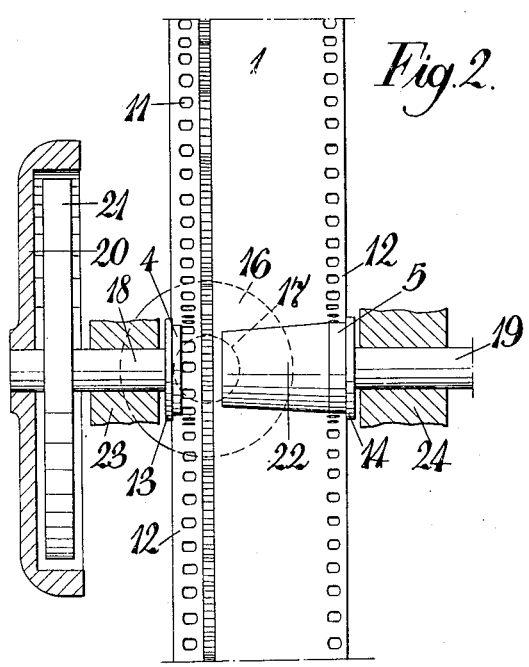

In the drawing:

Fig. 1 is a more or less diagrammatic illustration of film driving or advancing apparatus embodying the invention, and Fig. 2 is a view taken at right angles to Fig. 1.

Referring now to the drawing, the film 1 is inserted between a driving wheel 3, which is advantageously in the form of a sprocket, as shown, and an associated guide roller 6, from whence it is led between wheels or rollers 4, 5 carried, respectively, on shafts 18 and 19, and associated conical guide-rollers 7, 8 to a driving wheel 9, with associated guide roller 10. The wheels or rollers 5, 4, which may be covered with rubber, press against the strips 12 of the film lying outside the sprocket-engaging perforations 11 and are fitted with flanges 13, 14, serving as supports for the edges of the film 1. The film thus drives these wheels 4, 5. At the reproducing point the film is illuminated from the light aperture 17 of the projector light 16. When the invention is employed for other tape-like material, for instance magnetized steel ribbon, in so called telegraphones, the poles of the magnet grip the ribbon at the point of reproduction 2.

The wheels 4, 5 are placed on separate shafts 18, 19, the shaft 18 carrying two flywheels 20, 21, the one 20, being firmly secured to the shaft 18, whereas the other flywheel, 21, is not so secured. In order to facilitate the winding of the film strip 1 onto the wheels, 4, 5, one of these wheels, viz. 5, is provided with an extension 22, preferably of conical shape, which however does not come in contact with the film when in motion and which ends at such a distance from the opposite wheel 4, that the light from the light-aperture 17 of the light 16 may pass freely between this extension 22 and the roller 4. The shafts 18 and 19 are carried in bearings 23 and 24 respectively.

The arrangement works in the following manner. The drive 9 provides the means by which the film is pulled past the light-aperture 2, which constitutes the place of recording or reproduction. The advancement of the film to this aperture is effected by means of the drive 3. The drives 3 and 9 may conveniently be connected by means of a suitable mechanism which however is not shown in the drawing. Although the friction-wheels 4, 5 are preferably driven by the film 1 only, it may in some instances be efficient to supply part of the power required for driving the wheels from the driving motor of the apparatus. This is conveniently arranged by connecting the wheels 4, 5 or one of them with the rigid transmission system of the driving motor, which for instance may drive the wheels 3 and 9, by means of a non-synchronous transmission arrangement, for instance a friction-coupling.

By means of the guide rollers 6, 7, 8 and 10 the film is forced to form elastic bends 25, 29 on each side of the light aperture 2. An occasional irregularity in the speed of the wheels 3 and 9 will cause the one bend, for instance 29, to be stretched, while the other for instance 25, may be extended. The mechanical mass of these bends of the film being inconsiderable, there is practically no mechanical inertia. In the event of continued difference in tension between the two bends an acceleration or a retardation of the speed of the friction-discs 4, 5 and the flywheel 20 will occur. The degree of irregularity may be reduced to any value by a suitable design of the flywheel 20.

It has been found, however, that under certain unfavourable conditions torsion may occur in the shaft 18 and the flywheel 20, the frequency depending on the mass of these parts and the elastic force of the bends in the film, and that this torsion may affect the speed of the film. An acoustic effect similar to surging may thus arise. A subdued oscillating motion with a period of oscillation of a few seconds is also easily perceptible in the bends 25, 29. This interference is however eliminated by the frictional action of the flywheel 21, which is loose on the shaft 18. The minimum friction in the bearing between the flywheel 21 and the shaft 18 will hardly be larger than the air friction of the wheel 21, which therefore at uniform speed completely follows the wheel 20. In the event of occasional acceleration or retardation arising the required action on the wheel 21, should, however, exceed the friction of the bearing causing the wheel 21 either to accelerate or retard from the speed of the wheel 20, depending on that wheel being retarded or accelerated, whereby any possible irregularity in the rotation of the flywheel 20 is suppressed.

If bends of the kind referred to above, 29 and 25 respectively are to be formed, the guide-rollers must be placed in fixed positions in relation to the drives or the wheels driven by the film.

It is naturally unnecessary to arrange elastic bends of the film on both sides of the reproduction point 2, as shown in the drawing. The arrangement may thus be simplified to suit the particular requirements existing. Only one drive may be provided, for instance, and one bend of the film between that and the reproduction point. In that case the drive should preferably take place by a drawing or pulling action.

Neither is it necessary to arrange the guide wheels both at the drives 3 and 9 and the discs 4 and 5. If the discs 4, 5 and the parts connected to them are moved slightly to the left in Figure 1, the guide rollers 7 and 8 or one of them may be excluded without risking any interference with the function of the arrangement. If the friction discs 4, 5 are moved a little in the opposite direction this would make it possible to exclude for instance the guide-roller 10.

For convenience the assembly of rotatable members 4, 5, 7 and 8 and members 6 and 10 may all be considered as idler film guiding rollers since none of these elements transmits any driving force to the film, but on the contrary are driven by the film.

The invention is not limited to relate to arrangements for the running of film with photographic registration only. With the same technical effect it may be employed for moving any other tape-like material provided, for instance, with magnetic or mechanical registration of acoustic waves or other variable physical phenomena. The invention may also be employed equally well in apparatus for recording such registration and in apparatus for reproduction of the registration.

Having now described our invention, what we claim as new and desire to secure by Letters Patent is:—

1. In film recording or reproducing apparatus, driving mechanism for moving the film band, guiding members consisting of two aligned pulleys, each of them making frictional running contact with one of the edges of the film and driven by said film, one of said pulleys being mounted on a shaft, a fly wheel arrangement consisting of two wheels mounted on said shaft, one of said wheels being secured to the shaft and the other wheel revolving frictionally around the shaft.

2. In film recording or reproducing apparatus, driving mechanism for moving the film, a plurality of film guiding idler rollers including a roller adjacent to the place of recording or reproduction around which the film is adapted to be partially wrapped to drive the roller, and a flywheel associated with said roller and adapted to rotate therewith, certain of said idler rollers being positioned to cause a portion of the film between the driving mechanism and the roller with which the fly-wheel is associated to assume the form of a curve for absorbing irregularities in speed of movement of the film at the driving mechanism before such irregularities reach the first-mentioned roller due to the elasticity of the curved portion of the film.

3. In film recording or reproducing apparatus, driving mechanism for moving the film, a plurality of film guiding idler rollers including a roller adjacent to the place of recording or reproduction around which the film is adapted to be partially wrapped to drive the roller, and inertia mass associated with said roller comprising a flywheel frictionally connected with but substantially freely rotatable with respect to the roller, certain of said idler rollers being positioned to cause a portion of the film between the driving mechanism and the roller with which the inertia mass is associated to assume the form of a curve for absorbing irregularities in speed of movement of the film at the driving mechanism before such irregularities reach the first-mentioned roller due to the elasticity of the curved portion of the film.

4. In film recording or reproducing apparatus, driving mechanism for moving the film, a plurality of film guiding idler rollers including a roller adjacent to the place of recording or reproduction around which the film is adapted to be partially wrapped to drive the roller, and inertia mass associated with said roller comprising two fly-wheels, one of which is frictionally connected with but substantially freely rotatable with respect to the roller, certain of said idler rollers being positioned to cause a portion of the film between the driving mechanism and the roller with which the inertia mass is associated to assume the form of a curve for absorbing irregularities in speed of movement of the film at the driving mechanism before such irregularities reach the first-mentioned roller due to the elasticity of the curved portion of the film.

5. In film recording or reproducing apparatus, a driving sprocket for moving the film, a plurality of film guiding idler rollers including a roller adjacent to the place of recording or reproduction around which the film is adapted to be partially wrapped to drive the roller, inertia mass associated with said roller and adapted to rotate therewith, said plurality of rollers including also two rollers, one of which is associated with said driving sprocket arranged to cause a portion of the film between the driving sprocket and the first mentioned roller to assume the form of a curve for absorbing irregularities in speed of movement of the film at the driving mechanism before such irregularities reach the first-mentioned roller due to the elasticity of the curved portion of the film.

6. In film recording or reproducing apparatus, two spaced driving mechanisms and a plurality of film guiding idler rollers intermediate said mechanisms including a roller adjacent to the place of recording or reproduction around which the film is adapted to be partially wrapped to drive the roller and additional rollers positioned to cause portions of the film between each of the driving mechanisms and the first-mentioned roller to assume the form of curves for absorbing irregularities in the speed of movement of the film at the driving mechanisms before such irregularities reach the roller adjacent to the place of recording or reproduction.

7. In film recording or reproducing apparatus, a freely journalled roller adjacent to the place of recording or reproduction adapted to be engaged and driven solely by the film, inertia mass associated with said roller and adapted to rotate therewith, driving means for causing the film to move over said roller, and additional rollers positioned to cause a portion of the film to assume a curve through which driving force is transmitted to the first-mentioned roller from the driving mechanism.

8. In film recording or reproducing appartus, a freely journalled roller adjacent to the place of recording or reproduction adapted to be engaged and driven solely by the film, inertia mass associated with said roller comprising two flywheels, one of which is frictionally connected with but substantially freely rotatable with respect to the roller, driving means for causing said film to move over said roller, and additional rollers positioned to cause a portion of the film to assume a curve through which driving force is transmitted to the first-mentioned roller from the driving mechanism.

9. In film recording or reproducing apparatus, the combination with a freely journalled roller adjacent to the place of recording or reproduction and adapted to be engaged and driven by the film, of inertia mass associated with said roller and adapted to rotate therewith, and means including synchronized driving members and a plurality of idler rollers for causing the film to move toward and away from the first-mentioned roller in slack condition with all of the driving force for the first-mentioned roller being transmitted through the slack portions of the film.

10. Apparatus for advancing a sound record film past a point of translation at a substantially uniform speed comprising a drum member for supporting the film at the point of translation and adapted to be rotated by the film, and inertia mass frictionally connected for rotation with said drum member, the amount of friction in the frictional connection being only slightly larger than the air friction of the inertia mass.

11. Apparatus for advancing a sound record film past a point of translation at a substantially uniform speed comprising a drum member for supporting the film at the point of translation and adapted to be rotated by the film, and inertia mass comprising a plurality of fly-wheels connected for rotation with said drum member, at least one of said fly-wheels being frictionally connected and the amount of friction in the frictional connection being only slightly larger than the air friction of the fly-wheel so connected.

12. Film driving apparatus including a drum member for guiding a film adjacent to a place of recording or reproduction and adapted to be engaged and driven by the film, means for moving the film toward and away from said drum member, a shaft rotatable with said drum member, and a plurality of fly-wheels carried by said shaft, at least one of which fly-wheels is substantially freely rotatable on said shaft whereby the film is relieved of excessive load in starting rotation of said drum member.

13. That improvement in the art of advancing a film past a given point of translation by the utilization of synchronized driving members and rotatable guide members intermediate said driving members which consists in driving the film in a slack condition between said driving members, causing the slack film to provide the sole drive for one of said guide members adjacent to said point of translation and subjecting said one of said guide members to the influence of inertia mass frictionally connected with but substantially freely rotatable with respect to one of said members.

14. In film recording or reproducing apparatus, means for moving the film, a plurality of film guiding idler rollers cooperating to position the film at the place of recording or reproduction and inertia mass comprising a plurality of flywheels connected with and adapted to rotate with one of said idler rollers, one of said flywheels being frictionally connected and the amount of friction in the frictional connection being only slightly larger than the air friction of the flywheel so connected.

15. In film recording or reproducing apparatus, a plurality of idler rollers adapted to be engaged and driven by a film and arranged to guide the film past a place of recording or reproduction and including a roller the momentary speed of which coincides with the momentary speed of the film at said place of recording or reproduction, and inertia mass frictionally connected with but substantially freely rotatable with respect to the last mentioned roller.

16. In the art of advancing a film past a given point of translation by the aid of film driving means and a guide roller the momentary speed of which coincides with the momentary speed of the film at said point of translation, that improvement which consists in driving the roller solely due to force transmitted from the film driving means through a slack curved portion of the film and subjecting the roller to the influence of inertia mass frictionally connected with but substantially freely rotatable with respect to the roller.

EMIL EINAR WILHELM ANDERSON.
GEORG KARL VILHELM JOHANSON.